(12) United States Patent
Han et al.

(10) Patent No.: US 11,872,531 B2
(45) Date of Patent: Jan. 16, 2024

(54) FLUORINE-BASED RESIN POROUS MEMBRANE AND METHOD FOR PREPARING THE SAME

(71) Applicant: LG CHEM, LTD., Seoul (KR)

(72) Inventors: Sungjae Han, Daejeon (KR); Joo Yeon Seo, Daejeon (KR); Byeong In Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 137 days.

(21) Appl. No.: 16/966,826

(22) PCT Filed: Oct. 18, 2019

(86) PCT No.: PCT/KR2019/013769
§ 371 (c)(1),
(2) Date: Jul. 31, 2020

(87) PCT Pub. No.: WO2020/080896
PCT Pub. Date: Apr. 23, 2020

(65) Prior Publication Data
US 2021/0039053 A1    Feb. 11, 2021

(30) Foreign Application Priority Data

Oct. 18, 2018   (KR) .................. 10-2018-0124560
Oct. 17, 2019   (KR) .................. 10-2019-0129384

(51) Int. Cl.
*B01D 71/36*   (2006.01)
*B01D 69/02*   (2006.01)
*B01D 67/00*   (2006.01)

(52) U.S. Cl.
CPC ......... *B01D 71/36* (2013.01); *B01D 67/0027* (2013.01); *B01D 69/02* (2013.01); *B01D 2323/08* (2013.01); *B01D 2325/023* (2013.01); *B01D 2325/025* (2013.01); *B01D 2325/04* (2013.01); *B01D 2325/22* (2013.01); *B01D 2325/24* (2013.01)

(58) Field of Classification Search
None
See application file for complete search history.

(56) References Cited

U.S. PATENT DOCUMENTS 5,064,593 A   11/1991   Tamaru et al.
8,757,395 B2   6/2014   Bacino et al.
(Continued)

FOREIGN PATENT DOCUMENTS

CN   1052434 A     6/1991
CN   103987449 A   8/2014
(Continued)

OTHER PUBLICATIONS

International Search Report and Written Opinion issued for International Application No. PCT/KR2019/013769 dated Feb. 6, 2020, 11 pages.

*Primary Examiner* — Jason M Greene
*Assistant Examiner* — Eric J McCullough
(74) *Attorney, Agent, or Firm* — ROTHWELL, FIGG, ERNST & MANBECK, P.C.

(57) ABSTRACT

The present disclosure provides a fluorine-based resin porous membrane exhibiting high mechanical strength and low heat shrinkage rate while having a fine pore size, and a method for preparing the same.

11 Claims, 5 Drawing Sheets

(56) References Cited

U.S. PATENT DOCUMENTS

| | | |
|---|---|---|
| 2006/0094320 A1 | 5/2006 | Chen et al. |
| 2009/0159526 A1 | 6/2009 | Okada et al. |
| 2010/0305217 A1 | 12/2010 | Qiu et al. |
| 2011/0049044 A1 | 3/2011 | Okada et al. |
| 2011/0052900 A1 | 3/2011 | Uno et al. |
| 2011/0192283 A1 | 8/2011 | Shimatani et al. |
| 2011/0240552 A1* | 10/2011 | Ishizuka ............... B29C 55/023 210/490 |
| 2012/0219756 A1 | 8/2012 | Yoshida et al. |
| 2013/0084447 A1* | 4/2013 | Shimatani ............... B32B 27/30 428/220 |
| 2014/0196840 A1* | 7/2014 | Ishii ................... B01D 39/1692 156/244.11 |
| 2015/0353694 A1* | 12/2015 | Hayashi ................ B29C 61/003 521/145 |
| 2016/0158709 A1 | 6/2016 | Gsell et al. |
| 2016/0308231 A1 | 10/2016 | Watanabe et al. |
| 2017/0012313 A1 | 1/2017 | Inoue et al. |
| 2020/0086283 A1* | 3/2020 | Tezuka ..................... C08J 3/11 |

FOREIGN PATENT DOCUMENTS

| | | | |
|---|---|---|---|
| CN | 103990387 | A | 8/2014 |
| JP | S52-132078 | A | 11/1977 |
| JP | H07-278331 | A | 10/1995 |
| JP | 2004-223334 | A | 8/2004 |
| JP | 2008-119662 | A | 5/2008 |
| JP | 2010-110914 | A | 5/2010 |
| JP | 2013-053195 | A | 3/2013 |
| JP | 2013-067076 | A | 4/2013 |
| JP | 2017-101231 | A | 6/2017 |
| KR | 10-2007-0073850 | A | 7/2007 |
| KR | 10-2009-0013190 | A | 2/2009 |
| KR | 10-2010-0089075 | A | 8/2010 |
| KR | 10-2011-0095164 | A | 8/2011 |
| KR | 10-2012-0007743 | A | 1/2012 |
| KR | 10-2013-0114907 | A | 10/2013 |
| KR | 10-2014-0073331 | A | 6/2014 |
| KR | 10-1479752 | B1 | 1/2015 |
| KR | 10-2015-0079108 | A | 7/2015 |
| KR | 10-2016-0091386 | A | 8/2016 |
| KR | 10-2016-0093016 | A | 8/2016 |
| WO | 2013-005431 | A1 | 1/2013 |

* cited by examiner

FLUORINE-BASED RESIN POROUS MEMBRANE AND METHOD FOR PREPARING THE SAME

CROSS-REFERENCE TO RELATED APPLICATION(S)

This application is a 35 U.S.C. 371 National Phase Entry Application from PCT/KR2019/013769 filed on Oct. 18, 2019, designating the United States, which claims the benefit of priority based on Korean Patent Application No. 10-2018-0124560 filed on Oct. 18, 2018 and Korean Patent Application No. 10-2019-0129384 filed on Oct. 17, 2019 with Korean Intellectual Property Office, the disclosures of which are incorporated herein by reference in their entity.

TECHNICAL FIELD

The present disclosure relates to a fluorine-based resin porous membrane exhibiting high mechanical strength and low heat shrinkage rate while having a fine pore size, and a method for preparing the same.

BACKGROUND OF THE INVENTION

Porous membranes used in various fields are required to have high filtration efficiency and gas and liquid permeability. Thus, there is known a method of uniformly adjusting the pore diameter distribution inside the porous membrane to increase the amount of fluid passing through the pores under a specific pressure.

The porous fluorine-based resin membrane may have characteristics such as high heat resistance, chemical stability, weatherability, non-flammability, strength, non-adhesiveness, low friction coefficient, and the like which are derived from a fluorine-based resin itself, and additionally, when produced as a porous body, it may have characteristics such as flexibility, liquid permeability, particle collection efficiency, low dielectric constant, and the like.

In particular, the porous membrane using polytetrafluoroethylene (PTFE) among these fluorine-based resins has high stability for various compounds, and thus, is often used as a microfiltration filter (membrane filter) for a mixture of gas and liquid forms, especially, in the semiconductor-related field, liquid crystal-related field, and food and medical-related field.

Such PTFE membrane is produced by making a preformed body using a paste composed of a mixture of PTFE powder and lubricant, forming the preformed body into a sheet by a rolling or extrusion process, heat-treating the sheet to remove the lubricant, and then performing an uniaxial stretching in the transverse direction (TD) or the machine direction (MD), or performing a biaxial stretching which stretches in the MD direction and then stretches in the TD direction.

However, when the PTFE membrane is produced by the method as described above, in a process such as extrusion, drying, and stretching, a phenomenon in which the shape or characteristics of the pores are not maintained due to high temperature and high pressure environment may occur, in particular, defective bubbles can be generated on the surface, and as a result, the produced PTFE porous membrane does not have sufficient strength and filtration performance Further, the porosity in the PTFE membrane is adjusted by stretching and sintering process. Thus, it is easy to secure the porosity of the separation membrane at the time of stretching. But the strength and pressure resistance in the transverse direction can be reduced, and further there is a problem that shrinkage occurs easily in the machine direction.

In order to reduce the shrinkage of the PTFE porous membrane produced by MD/TD stretching, a method of performing heat setting at a temperature equal to or higher than the Tm of PTFE has been proposed. In this case, the strength of the membrane increases while the residual stress decreases due to the high temperature. However, the fibril melts and breaks at a temperature equal to or higher than Tm, and as the thickness of the fibrils increases due to the fusion between the fibrils, the number of fibrils per unit area decreases, so that the pore size of the PTFE porous membrane increases.

Therefore, in the case of heat setting, it is possible to improve the strength of the PTFE porous membrane and reduce the shrinkage rate, but at the same time, the pore size of the porous membrane is also increased, making it difficult to prepare a PTFE porous membrane having high strength and low shrinkage rate even while having a small sized pore.

BRIEF DESCRIPTION OF THE PRESENT DISCLOSURE

The present disclosure provides a fluorine-based resin porous membrane exhibiting high mechanical strength and low heat shrinkage rate while having a fine pore size, and a method for preparing the same.

One embodiment of the present disclosure provides a fluorine-based resin porous membrane comprising a plurality of fluorine-based resin fibrils, wherein a ratio of the average thickness of fibrils in the surface region to the average thickness of fibrils in the inner region of the porous fluorine-based resin membrane (average thickness of fibrils present in the surface region/average thickness of fibrils present in the inner region of the membrane) is 1.8 to 3, and wherein the surface region is a region within 10% of the total thickness of the membrane from the surface of the porous fluorine-based resin membrane, and the inner region is a region excluding the surface region.

Another embodiment of the present disclosure provides a method for preparing a fluorine-based resin porous membrane comprising the steps of: extruding a fluorine-based resin composition prepared by mixing a fluorine-based resin and a lubricant into a sheet to prepare a porous fluorine-based resin sheet; stretching the porous fluorine-based resin sheet in a ratio of from 1 to 12 times in the machine direction (MD) at a temperature of 200° C. to 340° C.; and stretching the sheet stretched in the machine direction (MD) in a ratio of from 5 to 25 times in the transverse direction (TD) at 200° C. to 320° C. and then heat setting the stretched sheet at a temperature of 370° C. to 390° C. for 5 seconds to 60 minutes.

DETAILED DESCRIPTION OF THE PRESENT DISCLOSURE

Hereinafter, a fluorine-based resin porous membrane, a method for preparing the same, and a filter using the same according to specific embodiments of the present disclosure will be described in more detail.

The term "fluorine-based resin porous membrane" as used herein means a membrane prepared using a fluorine-based resin such as polytetrafluoroethylene (PTFE), the membrane including pores. In particular, in the present disclosure, it includes the meaning of a filtration membrane used for removing foreign substances and the like.

In the present disclosure, it was confirmed that the physical properties such as mechanical strength and shrinkage rate of the porous fluorine-based resin membrane may vary depending on thickness changes of the fibril in the surface and inside of the porous membrane. From these results, during the production of the porous fluorine-based resin membrane, the fibril thickness according to the position of the surface and the inside in the porous membrane was optimized by controlling a shape of the extrudate of the fluorine-based resin composition and a heat setting conditions after stretching. Thus, the prepared fluorine-based resin porous membrane can exhibit high mechanical strength and low shrinkage rate while keeping the small and uniform pore size in the membrane.

Specifically, the porous fluorine-based resin membrane according to an embodiment of the present disclosure includes a plurality of fluorine-based resin fibrils, wherein a ratio of the average thickness of fibrils in the surface region to the average thickness of fibrils in the inner region which excludes the surface region within 10% of the total thickness of the membrane from the surface of the porous fluorine-based resin membrane (average thickness of fibrils present in the surface region/average thickness of fibrils present in the inner region of the membrane) is 1.8 to 3.

Meanwhile, as used herein, the "thickness" of the fibrils means an average thickness unless otherwise defined, and the average diameter of a cross section of the fibril observed using a scanning electron microscope (SEM) is defined as a thickness.

As described later, the thickness of the fibril in the porous fluorine-based resin membrane may be changed depending on the position in the porous membrane by using a sheet-type extrudate and optimizing the conditions in the heat setting process after stretching. Specifically, in the porous fluorine-based resin membrane, an average thickness of fibrils present in a surface region within 10% of the total thickness of the membrane from the surface of the membrane is thicker than the average thickness of fibrils in the inner region of the membrane. More specifically, the ratio of the average thickness of fibrils present in the surface region to the average thickness of fibrils present in the inner region of the membrane (the average thickness of fibrils present in the surface region/the average thickness of fibrils present in the inner region of the membrane) is 1.8 to 3. As such, the ratio of the average thickness of fibrils in the surface region to the average thickness of fibrils in the inner region of the membrane satisfies the above-mentioned ranges, thereby exhibiting an effect of high strength and small shrinkage while having small-sized pores.

If the ratio of the average thickness of fibrils in the surface region and the inner region is greater than 3, the porosity may decrease and the tortuosity of the porous membrane may increase, which may lower the flow rate. In addition, in order to have a thickness ratio of more than 3, a heat setting process should be performed at a high temperature of 400° C. or higher. In this case, breakage occurs and thickness unevenness is serious, thus it is difficult to produce a normal membrane. Moreover, when the average thickness ratio of fibrils is less than 1.8, the improvement effect due to the control of the fibril thickness ratio depending on the position is insignificant. More specifically, the ratio of the average thickness of fibrils present in the surface region to the average thickness of fibrils present in the inner region of the membrane may be 1.8 or more, 1.9 or more, or 2.0 or more, 3 or less, or 2.8 or less.

In addition, the porous fluorine-based resin membrane according to an embodiment of the invention may, under the conditions that meet the thickness ratio range of the fibrils as described above, have the average thickness of the fibrils in the surface region of the membrane of 50 to 140 nm, more specifically, 50 nm or more, or 70 nm or more, or 100 nm or more, or 120 nm or more, or 130 nm or more, or 140 nm or less, or 135 nm or less.

Further, the average thickness of the fibrils in the inner region of the membrane may be 40 to 70 nm, and more specifically, it may be 40 nm or more, or 45 nm or more, 70 nm or less, or 68 nm or less. By having the average thickness of the above range, it can exhibit excellent strength properties, and also can exhibit high porosity while including pores having a smaller pore size.

In the present disclosure, the average thickness of fibrils on the surface and in the inside of the fluorine resin porous membrane can be measured by a method in which a field emission scanning electron microscope (FE-SEM) equipment is used to photograph images of the surface and the inside of the porous fluorine-based resin membrane, respectively, and the thickness of the fibrils on the surface and in the inside can be measured from the photographed images using a software connected to the photographing equipment. The specific method thereof will be described in detail in Experimental Examples below.

Meanwhile, in the present disclosure, in the porous fluorine-based resin membrane, the "surface region" means a portion or surface in contact with the outside in the porous membrane, and the "inner region" means a portion or region that is not in contact with the outside, i.e., excluding the surface region in the porous membrane. Specifically, the "surface region" means an area within 10% of the total thickness of the membrane from the surface of the porous fluorine-based resin membrane, and the "inner region" means a region of greater than 10%, more specifically greater than 10% and less than 90% of the total thickness of the membrane from any one surface of the porous fluorine-based resin membrane.

Meanwhile, in the porous fluorine-based resin membrane according to an embodiment of the present disclosure, the microstructure consisting of a plurality of fibrils and a plurality of nodules connected to each other by the fibrils, form a porous structure with a continuous porosity.

Specifically, the average diameter of the pores (mean pore size) contained in the porous fluorine-based resin membrane is 0.1 μm to 0.25 μm, and the maximum diameter of the pores (max pore size) may be 0.3 μm to 0.45 μm. Due to the pores satisfying the above range, it is possible to exhibit excellent filtration efficiency without lowering the permeability. Considering the remarkably improved effect due to the control of the pore size, more specifically, the average diameter of pores contained in the porous fluorine-based resin membrane may be 0.1 μm or more, or 0.15 μm or more, or 0.2 μm or more, and 0.25 μm or less, or 0.23 μm or less, and the maximum diameter of the pores may be 0.3 μm or more, or 0.35 μm or more, or 0.4 μm or more, and 0.45 μm or less, or 0.42 μm or less.

In the present disclosure, the average pore diameter and the maximum pore diameter of the pores can be calculated from the change curve of the flow rate (Wet Curve) according to the pressure measured using the Capillary Flow Porometer instrument, respectively, and the specific method will be described in detail in Experimental Examples below.

Moreover, the porous fluorine-based resin membrane has a porosity of 70% to 90% while satisfying the above-described pore conditions. More specifically the porous membrane has a porosity of 70% or more, or 73% or more, or 75% or more, and 90% or less, or 85% or less, or 80% or less. As such, as the porosity increases while the average pore size is small, the permeability may be remarkably improved. If the porosity exceeds 90%, it may be difficult to maintain the physical properties.

Meanwhile, in the present disclosure, the porosity of the porous membrane is determined according to the following Equation 1 after obtaining the density from the volume and weight of the porous membrane.

$$\text{Porosity}(\%) = \{1 - (\text{Weight [g]}/(\text{Thickness [cm]} \times \text{Area [cm}^2\text{]} \times \text{True Density [g/cm}^3\text{]}))\} \times 100 \quad \text{[Equation 1]}$$

wherein, in Equation 1, the true density is represented by a true density of the fluorine-based resin (2.2 g/cm$^3$).

Further, the porous fluorine-based resin membrane has a thickness of 20 μm to 100 μm, more specifically, it has a thickness of 20 μm or more, or 30 μm or more, and 100 μm or less, or 50 μm or less. By satisfying the thickness range in addition to the above pore conditions, it can exhibit the filtration efficiency, the permeability, and the dimensional stability in a well-balanced manner.

Meanwhile, in the porous fluorine-based resin membrane, the fluorine-based resin may be used without limitation as long as it is usually used in the fluorine-based resin membrane, and specific examples thereof include polytetrafluoroethylene (PTFE), tetrafluoroethylene-perfluoroalkylvinylether copolymer (PFA), tetrafluoroethylene-hexafluoropropylene copolymer (FEP), ethylene-tetrafluoroethylene copolymer resin (ETFE), tetrafluoroethylene-chlorotrifluoroethylene copolymer (TFE/CTFE) or ethylene-chlorotrifluoroethylene resin (ECTFE), etc. and any one or a mixture of two or more thereof may be used. Among them, in consideration of the fact that the chemical resistance, heat resistance, weatherability and nonflammability of the porous membrane can be improved, PTFE may be used.

Further, when using the PTFE resin, a standard specific gravity (SSG) of the PTFE resin may be 2.14 or more and 2.22 or less, more specifically 2.14 or more , or 2.15 or more, or 2.16 or more, and 2.22 or less, 2.2 or less, or 2.18 or less. The higher the molecular weight of PTFE, the lower the SSG When the PTFE resin having a standard specific gravity within the above range is used, it is easier to control the thickness of the fibrils.

Meanwhile, the standard specific gravity of the PTFE is a specific gravity defined by a measuring method based on Japanese Industrial Standards (JIS) K6892, and shows a negative correlation with average molecular weight.

Further, in the present disclosure, the molecular weight of the polymer resin, specifically a number average molecular weight and a weight average molecular weight, can be measured by gel permeation chromatography (GPC) with standard polystyrene for calibration.

Specifically, the gel permeation chromatography (GPC) apparatus can be measured using a Polymer Laboratories PLgel MIX-B 300 mm long column and PL-GPC220 instrument manufactured by Waters. At this time, a measurement temperature was 160° C., and 1,2,4-trichlorobenzene was used for a solvent at a flow rate of 1 mL/min. And the polymer sample was supplied with a concentration of 10 mg/10 mL in an amount of 200 μL. Mw can be obtained using a calibration curve formed using a polystyrene standard. 9 kinds of the polystyrene standard is used with a weight average molecular weight of 2,000 g/mol, 10,000 g/mol, 30,000 g/mol, 70,000 g/mol, 200,000 g/mol, 700,000 g/mol, 2,000,000 g/mol, 4,000,000 g/mol, and 10,000,000 g/mol.

The porous fluorine-based resin membrane can be prepared by the method comprising the steps of: extruding a fluorine-based resin composition prepared by mixing a fluorine-based resin and a lubricant into a sheet to prepare a porous fluorine-based resin sheet (step 1); stretching the fluorine-based resin sheet in a ratio of from 1 to 12 times in the machine direction (MD) at a temperature of 200° C. to 340° C. (step 2); and stretching the sheet stretched in the machine direction (MD) in a ratio of from 5 to 25 times in the transverse direction (TD) at 200° C. to 320° C. and then heat setting the stretched sheet at a temperature of 370° C. to 390° C. for 5 seconds to 60 minutes (step 3). Thus, according to another embodiment of the invention, there is provided a method for preparing the fluorine-based porous membrane.

Hereinafter, the present disclosure will be described in detail for each step.

Step 1 is a step of preparing a fluorine-based resin sheet.

Specifically, the fluorine-based resin sheet can be prepared by mixing a fluorine-based resin and a lubricant to prepare a fluorine-based resin composition, and extruding the composition into a sheet.

In this case, the above-described resin may be used as the fluorine-based resin. Further, when using PTFE resin as the fluorine-based resin, the PTFE resin may be prepared by a conventional method such as emulsion polymerization, and may be used in the form of a powder.

Further, the lubricant serves to facilitate the extrusion by getting the surface of the fluorine-based resin powder wet, and can be used without particular limitation as long as it can be removed by a method such as evaporation extraction by heat after molding into a sheet form. Specific examples thereof may include hydrocarbon oils such as liquid paraffin, naphtha, white oil, toluene, and xylene, various alcohols, ketones, esters, and the like.

When a porous membrane is prepared by stretching a fluorine-based resin sheet, fine fibrils are formed from fluorine-based resin particles at high temperature and high pressure, and fine pores may be formed by a nodule structure connected to each other by the fibrils. In order to form a connection of fibrils and a bond between fluorine-based resin particles tightly and to prepare a porous membrane having small pores, the amount of the lubricant to be used must be minimized However, if the amount of lubricant is too small relative to the resin, the load on the surface of the preformed body increases in the process of preparing the preformed body and subjecting to rolling, extrusion, etc., and therefore, the surface pores in the membrane are blocked and the surface becomes smooth like a film. When the surface of the membrane becomes film-like, the pores disappear on the surface and therefore, the lubricant is not discharged to the outside during the drying process, etc., and the lubricant that are not discharged to the outside are vaporized at high temperature in a subsequent process such as stretching, causing peeling inside the membrane or causing defects that detach the inside of the sample. Consequently, in the present disclosure, the lubricant may be used in an amount of 10 to 30 parts by weight based on 100 parts by weight of the fluorine-based resin, and more specifically, it may be used in an amount of 10 parts by weight or more, or 15 parts by weight or more, and 30 parts by weight or less.

The mixing of the fluorine-based resin and the lubricant may be performed according to a conventional method, and after mixing, a step of aging for a predetermined time may be further performed, as necessary, for uniform mixing of each component in the mixture. The aging may be specifically carried out by maintaining at a temperature of 30° C. to 50° C. for 12 to 24 hours.

Further, after the mixing process and optionally the aging process, prior to performing the extrusion process, a process of forming a preformed body by applying pressure to the mixture, i.e., the fluorine-based resin composition may be further performed as necessary. The process of forming the preformed body can be specifically carried out by applying a pressure of 1 to 5 MPa to the mixture or the aged mixture.

Subsequently, the composition or the preformed body obtained through the above process is extruded into a sheet.

Conventionally, at the time of producing the fluorine-based resin film, the composition comprising the fluorine-based resin was extruded in the form of a rod, and then deformed into a sheet through a calendaring process, but in the present disclosure, extrusion is performed directly in the form of a sheet or a film by using a die. In the present disclosure, the extrusion process determines the properties of the porous fluorine-based resin membrane. When the extrusion process to form a sheet or film is performed by applying a high pressure, the anchoring between the resin particles is formed and thus a seed capable of producing fibrils is formed. Further, a strong friction force acts between the die surface and the sheet, and thus the resin is bonded at a very high density on the surface of the sheet or film. As a result, fibrils having different thicknesses in the surface layer and the inside are prepared. At this time, the fibril thickness ratio in the surface and the inside can be further optimized through control of the extrusion condition.

Meanwhile, when extruded in the form of a rod and then deformed in the form of a sheet through a calendering as in the prior art, there is almost no difference in the thickness of fibrils in the surface and the inside, and the pore size is uneven at both side portions and center portions of the prepared porous membrane, thereby deteriorating the physical properties of the fluorine-based resin membrane. As a result, the prepared porous fluorine resin membrane is not suitable as a process filter in which uniformity of physical properties such as pore size is important.

Specifically, the extrusion process may be carried out at a temperature of 25° C. to 50° C. and a pressure of 1 to 40 MPa, and more specifically, it can be performed under the condition that the thickness of the fluorine-based resin sheet prepared after the extrusion process is 1 to 3 mm.

In addition, a process for rolling the extruded sheet after the extrusion process may be further performed. The rolling process may be performed according to a conventional method such as calendering, and specifically, it may be performed under a temperature of 30° C. to 100° C. and a pressure of 10 to 30 MPa. More specifically, the rolling process may be performed under the condition that the thickness of the rolled fluorine-based resin film is 100 to 300 μm.

Further, the rolling process may be performed once, or may be performed in two or more multi-steps, in consideration of the thickness of the fluorine-based resin film.

Next, a process for removing the lubricant by heat-treating the rolled fluorine-based resin film may be further performed. The temperature of the heat treatment is not particularly limited as long as it is a temperature capable of removing the lubricant, and specifically, the heat treatment can be performed at a temperature of 120° C. to 200° C., more specifically 120° C. or more, or 150° C. or more, and 200° C. or less, or 180° C. or less for a time when the lubricant can be completely removed.

Step 2 is a process of stretching the fluorine-based resin sheet prepared in step 1 in the machine direction (MD).

The stretching process may be carried out between rolls rotating at different speeds, or may be performed using a tenter in an oven.

Specifically, the stretching process may be performed by stretching the fluorine-based resin film in a stretching ratio of from 1 to 12 times, more specifically in a stretching ratio of 1 times or more, or 1.5 times or more, and 12 times or less, or 5 times or less, or 3 times or less in the machine direction. When performing the stretching in the machine direction under the above conditions, a node-fibril structure and a pore are formed. If the stretching ratio at the time of stretching in the machine direction is less than 1 times, fibrillation may not be performed sufficiently. Further, if the stretching ratio exceeds 12 times, there is a possibility that the length of the fibrils becomes excessively long, the porosity is significantly increased and thus, the shrinkage rate is increased.

In addition, the stretching process may be performed at a temperature of 200° C. to 340° C., and more specifically, it may be performed the temperature of 200° C. or higher, or 250° C. or higher, and 340° C. or lower, or 330° C. or lower. If the temperature during the stretching process is less than 200° C., pore formation is not sufficient, and when the temperature exceeds 340° C., there is a possibility that the pore size may be excessively increased. It is advantageous to form a porous structure when the stretching process is performed in the above temperature range.

Next, in the step 2 for preparing a fluorine-based resin porous membrane according to an embodiment of the present disclosure, a stretching process is conducted in a direction orthogonal to the stretching direction of the fluorine-based resin film stretched in the machine direction in step 1, i.e., in a transverse direction, and then a heat setting process is conducted.

Specifically in step 2, the stretching process may be performed in a stretching ratio of from 5 to 25 times, and more specifically, it may be performed by stretching the fluorine-based resin film in the transverse direction in a stretching ratio of 5 times or more, 8 times or more, and 25 times or less, or 15 times or less. The stretching process in the transverse direction affects the formation of a node-fibrils structure in the porous membrane of fluorine-based resin. If the stretching ratio during the stretching step in the transverse direction is less than 5 times, there is a possibility that the porous membrane is produced with a low porosity. Moreover, when the stretching ratio exceeds 25 times, there is a problem that the shrinkage rate becomes high.

Further, the stretching process may be performed at a temperature of 200° C. to 320° C. When performing the transverse direction stretching process under the above conditions, the porosity is increased while the average pore size is reduced, as a result, the shrinkage resistance of the porous membrane, especially, the shrinkage resistance in the transverse direction can be improved.

Subsequently, a heat setting process of the transversely stretched fluorine-based resin film is performed.

The heat setting process is for preventing the heat shrinkage of the finally prepared fluorine-based film porous membrane, and may be performed at a temperature of 370° C. to 390° C. for 5 seconds to 60 minutes. When performing the heat setting process under the above conditions, the pore size can be made uniform in the finally prepared fluorine-based resin porous membrane. However, if the heat setting process is performed at a temperature of less than 370° C. or performed within 5 seconds, the thickness ratio of fibrils are not satisfied, or the effect of preventing heat shrinkage is not sufficient. Further, if it is carried out either at 390° C. or higher or for more than 60 minutes, the pores may be large due to problems such as melting of fibrils. More specifically, the temperature at the time of heat setting may be 370° C. or higher, or 375° C. or higher, and 390° C. or lower, or 380° C. or lower, and the heat set time, i.e., the residence time, may be 5 seconds or more, and 60 minutes or less, or 10 minutes or less, or 1 minute or less, or 20 seconds or less.

Through the preparation process as described above, it is possible to prepare a fluorine-based resin porous membrane with optimized fibril thickness ratio in the surface and the inside of the porous membrane. The resulting fluorine-based resin porous membrane can exhibit low shrinkage together with excellent mechanical strength properties.

Further, the prepared fluorine-based resin porous membrane can maintain a high porosity while having a fine pore size, and thus, the amount of fluid passing through the porous membrane per unit time under a certain pressure can also be relatively increased. As a result, the filtration efficiency and permeability can be improved in a well-balanced manner.

Further, in case of the conventional porous membrane having a fine thickness, the shape or diameter of pores may be changed by a pressure applied during filtration, and the membrane itself may rupture, and thereby the filtration property of the membrane may be significantly deteriorated. The porous fluorine-based resin membrane prepared according to the aforementioned preparation method not only has excellent mechanical properties, but also has such characteristics that the membrane shape or the shape of the internal pores do not change significantly during the preparation process and the filtration operation process.

Thus, according to another embodiment of the present disclosure, there is provided a fluorine-based resin porous membrane prepared by the above-described preparation method and having a heat shrinkage rate together with excellent strength characteristics.

Specifically, for the porous fluorine-based resin membrane prepared by the above preparation method, the tensile strength in the MD direction as measured according to ASTM D 882 is 60 to 100 MPa, and the tensile strength in the TD direction is 70 to 120 MPa, more specifically the tensile strength in the MD direction is 60 to 90 MPa, and the tensile strength in the TD direction may be 70 To 100 MPa.

Further, for the porous fluorine-based resin membrane, the heat shrinkage rate calculated according to Equation 2 below using a length value in the transverse direction changed after heat treatment at 120° C. for 30 minutes, and a length value in the transverse direction before heat treatment is 10% or less, or 8% or less, or 3 to 7%, which is excellent in dimensional stability at high temperature. Thereby, the dimensional stability can be maintained even under conditions of being in contact with high-temperature sulfuric acid or the like when the porous fluorine-based resin membrane is applied to a product.

[Equation 2]

$$\text{Heat shrinkage rate (\%)} = 100 \times \left[ \frac{\begin{array}{c}(\text{Length in transverse direction} \\ \text{before heat treatment} - \text{Length} \\ \text{in transverse direction after} \\ \text{heat treatment})\end{array}}{\begin{array}{c}\text{Length in transverse direction} \\ \text{before heat treatment}\end{array}} \right]$$

Thereby, the porous fluorine-based resin membrane can be widely used as a filter medium for corrosive gas and liquid, a permeable membrane for electrolysis, filter for a processor, and a battery separator, and can also be used for microfiltration of various gases and liquids used in the semiconductor industry.

According to another embodiment of the present disclosure, a filter including the aforementioned fluorine-based resin porous membrane, and a filter device are provided.

The filter may further include a filter element such as a nonwoven fabric, a woven fabric, a mesh, or a screen, in addition to the porous fluorine-based resin membrane, and may have various forms such as a flat type, a wrinkle type, a spiral type or a hollow cylinder type.

ADVANTAGEOUS EFFECTS

The porous fluorine-based resin membrane according to the present disclosure exhibits high mechanical strength and low heat shrinkage rate while having a fine pore size. Accordingly, it can be particularly useful as a filter, especially a filter for a process, which requires excellent dimensional stability together with high mechanical strength and low shrinkage.

Hereinafter, the present disclosure will be described in further detail with reference to the following preferred Examples so as to facilitate better understanding of the present disclosure. However, it should be understood that the following Examples are given by way of illustration of the present disclosure only, and are not intended to limit the scope of the present disclosure.

EXAMPLE 1

100 parts by weight of PTFE resin (650J™, manufactured by MCF, SSG (measured by JIS K6892): 2.163) was mixed with 22 parts by weight of a lubricant (Isopar™ H, manufactured by Exxon) to prepare a fluorine-based resin-containing composition, and then aged at 50° C. for 24 hours. Then, a preform block was prepared by applying a pressure of 2 MPa, and extruded into a sheet with a thickness of 1 mm using a extrusion equipment for a paste equipped with a die, and then rolled to a thickness of 300 μm through a calender to prepare a PTFE film. The prepared PTFE film was heat-treated by a Roll to Roll process in a heating oven at 200° C. to completely remove the lubricant.

The heat-treated PTFE film was stretched in a ratio of 3 times in the machine direction (MD) by using a difference in roll speed at 300° C., and stretched in a ratio of 10 times in the transverse direction (TD) using a TD tenter, and then the stretched film was heat-set at 380° C. for 9 seconds using a heating roll to prepare a PTFE porous membrane.

EXAMPLE 2, AND COMPARATIVE EXAMPLES 1 TO 3

A PTFE porous membrane was prepared in the same manner as in Example 1, except that the conditions described in Table 1 were carried out.

COMPARATIVE EXAMPLES 4 AND 5

A PTFE porous membrane was prepared in the same manner as in Example 1, except that it was extruded in the form of a rod during extrusion in Example 1, and the heat setting process was performed under the conditions described in Table 1.

COMPARATIVE EXAMPLE 6

For comparison of effects when the ratio of a thickness of fibrils on the surface of the porous fluorine-based resin membrane and a thickness of fibrils present in the inner region of the membrane was greater than 3, the heat fixing step was performed at a high temperature of 400° C. to prepare a fluorine-based resin porous membrane.

In detail, as disclosed in Table 1 below, an attempt was made to produce the PTFE porous membrane to produce in the same manner as in Example 1, except that the heat setting step was performed at 400° C. for 9 seconds. However, after the thickness unevenness was deepened, a rupture was occurred, making it impossible to produce a film.

EXPERIMENTAL EXAMPLE 1

The surface and the inside of the PTFE porous membranes produced in Examples 1 and 2 were observed by scanning electron microscope (SEM), respectively, and the results are shown in FIGS. 1a to 2b.

From the observation results, it was confirmed that in the case of the PTFE porous membranes of Examples 1 and 2 prepared by the production method according to the present disclosure, the thickness of fibrils on the surface thereof is larger as compared with that of the fibrils in the inside.

EXPERIMENTAL EXAMPLE 2

Figure 1A:
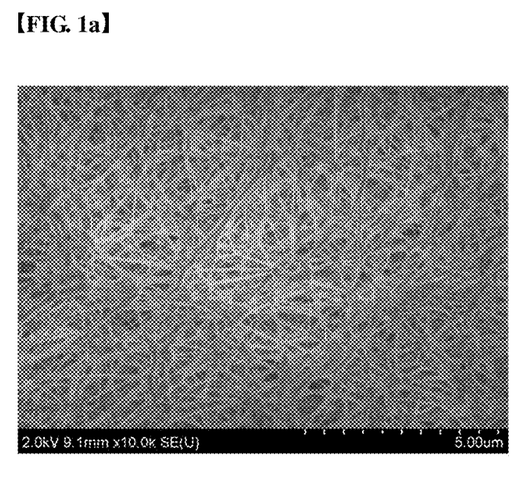
FIG. 1a is a photograph of fibrils on the surface of the porous fluorine-based resin membrane in Example 1 observed with a scanning electron microscope.
Figure 1B:
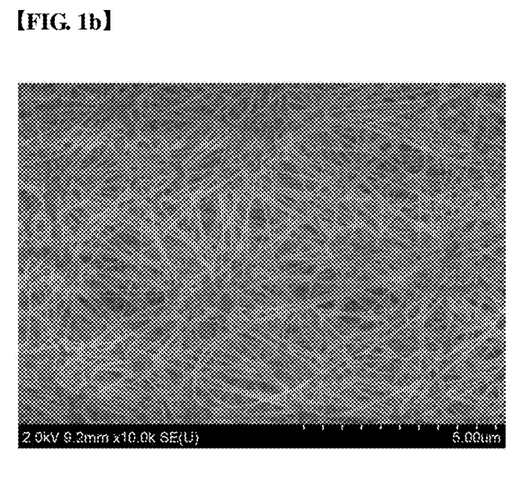
FIG. 1b is a photograph of fibrils inside the porous membrane observed with a scanning electron microscope.
Figure 2A:
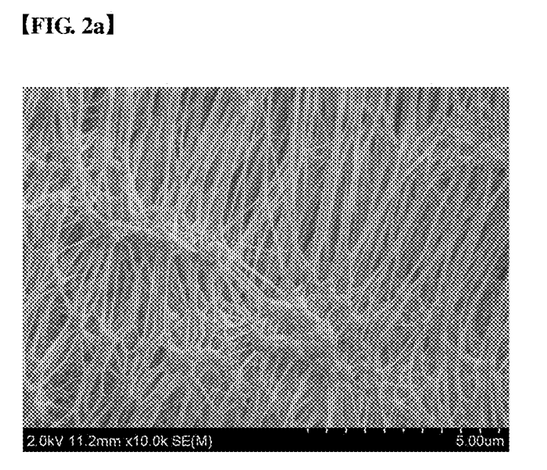
FIG. 2a is a photograph of fibrils on the surface of the porous fluorine-based resin membrane in Example 2 observed with a scanning electron microscope.
Figure 2B:
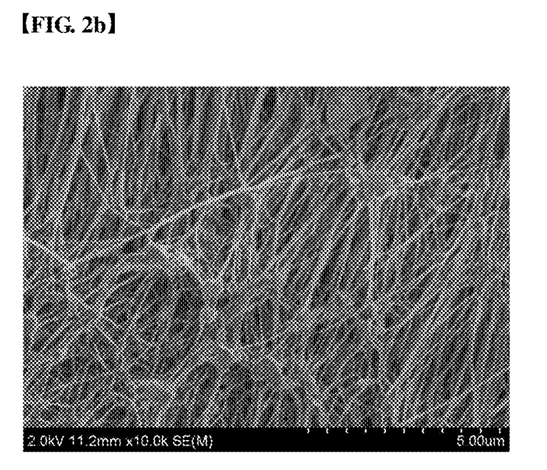
FIG. 2b is a photograph of fibrils inside the porous membrane observed with a scanning electron microscope.
Figure 3:
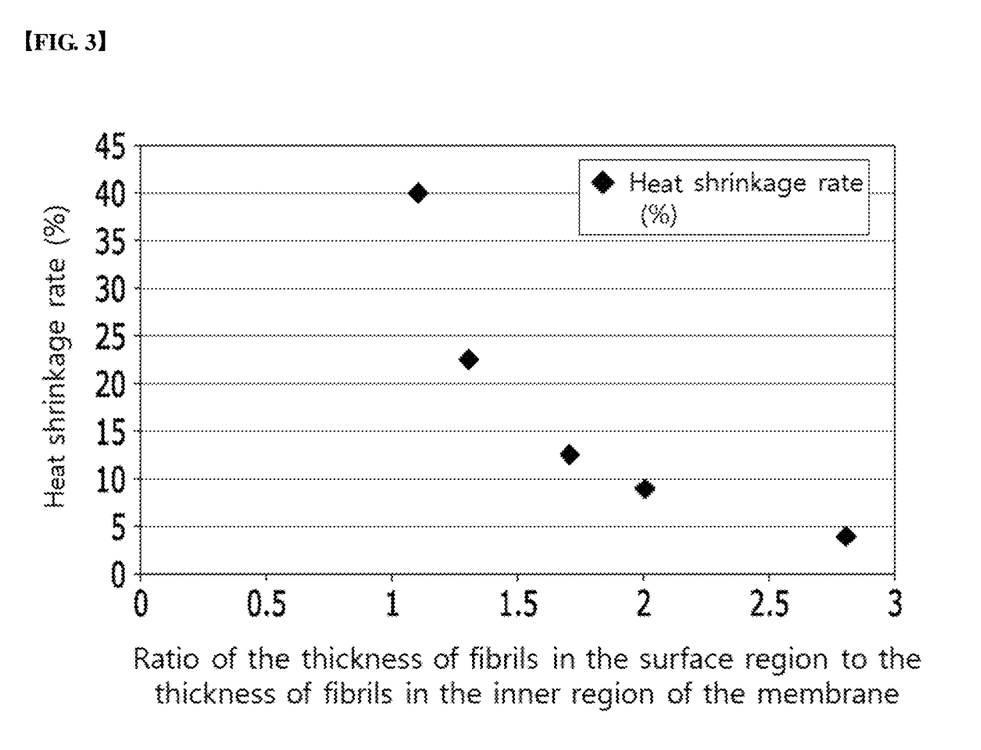
FIG. 3 is a result of evaluating the change in the heat shrinkage rate according to the change in the thickness ratio of fibrils on the surface and in the inside of the porous fluorine-based resin membrane in Experimental Example 2.
Figure 4:
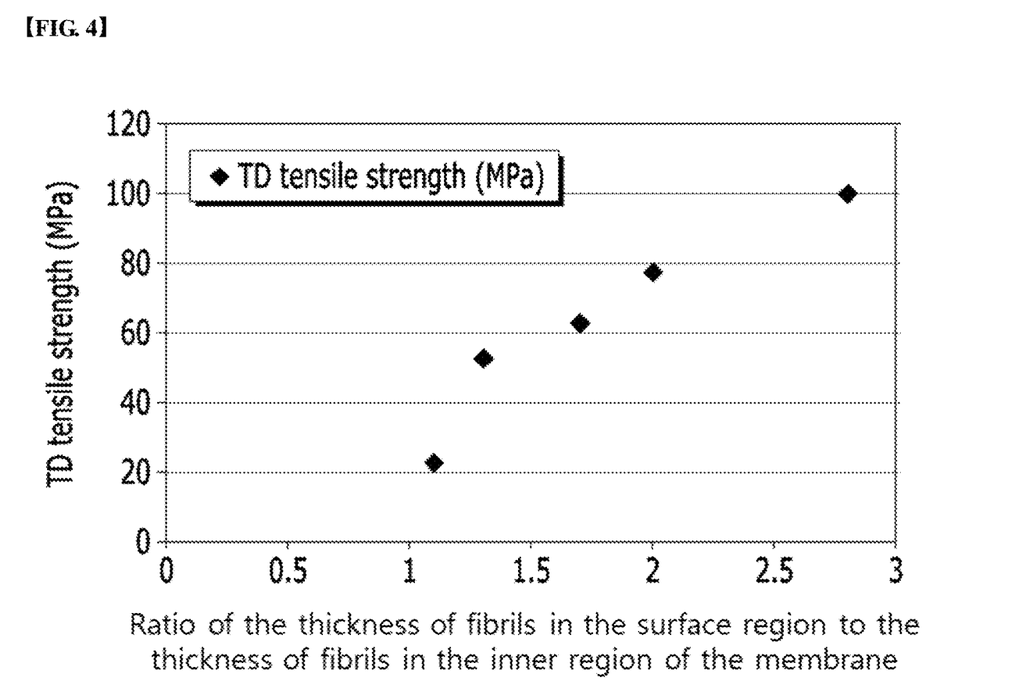
FIG. 4 is a result of evaluating the change in the tensile strength in the transverse direction (TD) according to the change in the thickness ratio of fibrils on the surface and in the inside of the porous fluorine-based resin membrane in Experimental Example 2.
Figure 5:
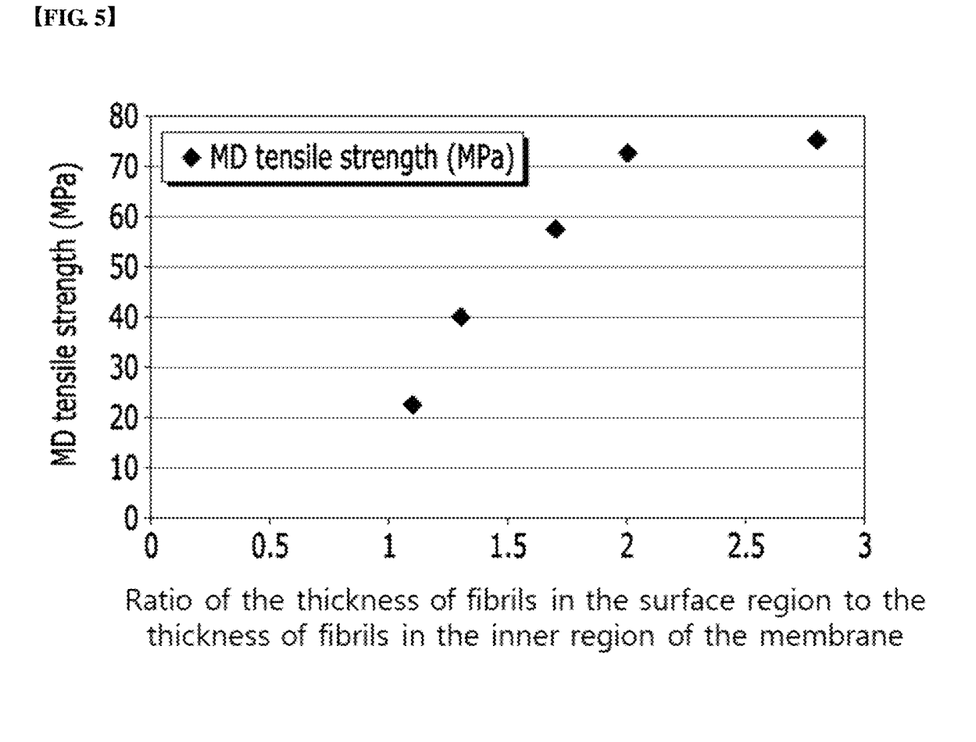
FIG. 5 is a result of evaluating the change in the tensile strength in the machine direction (MD) according to the change in the thickness ratio of fibrils on the surface and in the inside of the porous fluorine-based resin membrane in Experimental Example 2.

The PTFE porous membranes produced in Examples and Comparative Examples were evaluated by the following method, and the results are shown in Table 2 and FIGS. 3 to 5.

1) Thickness (μm): The thickness of the PTFE porous membranes prepared in Examples and Comparative Examples was measured using a Mitsutoyo 7327 thickness gage.

2) Porosity: The weight, thickness, and area of the PTFE porous membrane were measured, respectively, and the porosity was measured according to Equation 1 below. At this time, the thickness of the PTFE porous membrane was measured using Mitsutoyo dial thickness gauge.

$$\text{Porosity (\%)} = \{1-(\text{Weight [g]}/(\text{Thickness [cm]} \times \text{Area [cm}^2] \times \text{True Density [g/cm}^3]))\} \times 100 \quad \text{[Equation 1]}$$

wherein, in Equation 1, the true density was represented by a true density (2.2 g/cm$^3$) of the fluorine-based resin.

3) Average pore diameter (μm) and maximum pore diameter (μm): The average pore size and the maximum pore size were measured using PMI Capillary Flow Porometer.

In detail, the PTFE porous membrane was attached to the above measuring device, and completely immersed in a surface tension test solution (GALWICK), and air or nitrogen was injected into the porous membrane in the vertical direction. When the pressure increases constantly and reaches a certain pressure, a drop of test solution filling the largest hole in the pores was broken up. The pressure at this time was defined as a bubble point. Then, if the pressure continued to increase, then all of the solution filling the non-broken remaining small pores was also broken up. At this time, the flow rate (Wet Curve) according to the pressure was recorded and the size of the pore was calculated. The dry porous membrane that was not wetted with the test solution had a constant increase in flow rate as the pressure increases (Dry Curve). At this time, the average pore size of the pores corresponding to the pressure at the intersection of the graph where the dry curve is ½, and the wet curve was defined as the average pore size.

TABLE 1

| | Example | | Comparative Example | | | | | |
|---|---|---|---|---|---|---|---|---|
| | 1 | 2 | 1 | 2 | 3 | 4 | 5 | 6 |
| Extrusion condition | Extruded into a sheet | | Extruded into a sheet | | | Extruded into a rod | | Extruded into a sheet |
| Heat setting (H/S) temperature(° C.) | 380 | 375 | 360 | 350 | 340 | 340 | 380 | 400 |
| Heat setting time (residence time) (sec) | 9 | 9 | 15 | 20 | 25 | 25 | 9 | 9 |

4) Fibril thickness (nm): an image of the surface of the PTFE porous membrane was photographed using a field emission scanning electron microscope (FE-SEM) instrument. In the case of the fibril thickness of the inner region, the surface layer of the membrane was peeled off by about 5 μm using a tape, and then the inner layer was observed by FE-SEM.

Subsequently, the thickness (or diameter) of the fibrils on the surface of the porous membrane and the fibrils in the inside of the membrane was measured from the images photographed using the software connected to the instrument, and each average value and thickness ratio (average thickness ratio of fibrils in the surface region/the inner region) were calculated.

At this time, the surface region is within 10% of the total thickness of the membrane from the surface of the porous membrane, and the inner region was a region of more than 10% and less than 90% of the total thickness of the membrane from any one surface of the porous membrane.

5) Heat shrinkage rate (120° C., 30 min) (%): After cutting the PTFE porous membrane into a size of 5 cm in the machine direction (MD) and 5 cm in the transverse direction (TD), and then the changed dimensions when left in the free standing state at 120° C. for 30 minutes. The heat shrinkage rate was calculated according to Equation 2 below.

[Equation 2]

$$\text{Heat shrinkage rate (\%)} = 100 \times \left[ \frac{\text{(Length in transverse direction before heat treatment} - \text{Length in transverse direction after heat treatment)}}{\text{Length in transverse direction before heat treatment}} \right]$$

wherein, in Equation 2, the length in the transverse direction before heat treatment is 5 cm, and the length in the transverse direction after heat treatment is a length in the transverse direction changed after being maintained at 120° C. for 30 minutes.

6) Tensile strength: Tensile strength in the TD and MD directions was measured according to the test method as defined in ASTM D 882.

TABLE 2

| | | Example | | Comparative Example | | | | |
|---|---|---|---|---|---|---|---|---|
| | | 1 | 2 | 1 | 2 | 3 | 4 | 5 |
| Thickness (μm) | | 35 | 35 | 34 | 33 | 32 | 28 | 30 |
| Porosity(%) | | 80 | 80 | 79 | 78 | 75 | 75 | 76 |
| Average pore diameter(μm) | | 0.21 | 0.21 | 0.20 | 0.19 | 0.18 | 0.18 | 0.19 |
| Maximum pore diameter(μm) | | 0.42 | 0.42 | 0.40 | 0.38 | 0.36 | 0.34 | 0.38 |
| Average thickness of fibrils(nm) | Surface | 131.5 | 134.8 | 78.0 | 71.5 | 52.6 | 48.1 | 60.2 |
| | Inside | 46.5 | 67.4 | 45.2 | 55.0 | 46.2 | 44.1 | 45.8 |
| Average thickness ratio of the surface/inside fibrils | | 2.8 | 2.0 | 1.7 | 1.3 | 1.1 | 1.1 | 1.3 |
| Heat shrinkage rate (120° C., 30 min) (%) | | 3 | 7 | 12 | 24 | 40 | 43 | 6 |
| TD tensile strength(MPa) | | 100 | 72 | 58 | 44 | 25 | 18 | 75 |
| MD tensile strength(MPa) | | 75 | 60 | 45 | 35 | 19 | 14 | 54 |

In the porous fluorine-based resin membrane of Examples 1 and 2 prepared by the production method according to the present disclosure, the ratio of thickness of fibrils in the surface and inner regions of the membrane is in the range of 1.8 to 3, which exhibits a significantly reduced heat shrinkage rate while exhibiting excellent mechanical strength properties, as compared with the porous membrane of Comparative Examples having a thickness ratio of less than 1.8. Meanwhile, when the ratio of thickness of fibrils in the surface and inner regions of the membrane exceeds 3, breakage occurred during the film production process and thus, the membrane could not be produced (see Comparative Example 6).

The invention claimed is:

1. A porous fluorine-based resin membrane comprising a plurality of fluorine-based resin fibrils,
   wherein a ratio of an average thickness of fibrils in a surface region to an average thickness of fibrils in an inner region of the porous fluorine-based resin membrane is 2.0 to 2.8,
   wherein the surface region is a region within 10% of the total thickness of the membrane from the surface of the porous fluorine-based resin membrane, and the inner region is a region excluding the surface region,
   wherein the porous fluorine-based resin membrane has a porosity of 70 to 90%,
   wherein a heat shrinkage rate of the porous fluorine-based resin membrane is 10% or less, the heat shrinkage calculated according to Equation 2 using a length value in the transverse direction after a heat treatment at 120° C. for 30 minutes, and a length value in the transverse direction before the heat treatment, and
   wherein a tensile strength in the machine direction of the porous fluorine-based resin membrane is 60 to 100 MPa and a tensile strength in the transverse direction of the porous fluorine-based resin membrane is 70 to 120 MPa, the machine and transverse directions being measured according to ASTM D 882,

[Equation 2]

$$\text{Heat shrinkage rate (\%)} = 100 \times \left[ \frac{\text{(Length in transverse direction before heat treatment} - \text{Length in transverse direction after heat treatment)}}{\text{Length in transverse direction before heat treatment}} \right].$$

2. The porous fluorine-based resin membrane of claim 1, wherein the average thickness of the fibrils in the surface region of the membrane is 50 to 140 nm, and the average thickness of fibrils in the inner region of the membrane is 40 to 70 nm.

3. The porous fluorine-based resin membrane of claim 1, wherein the inner region corresponds to a region of greater than 10% and less than 90% of the total thickness of the membrane from a surface of the porous fluorine-based resin membrane.

4. The porous fluorine-based resin membrane of claim 1, wherein an average pore diameter of pores presented in the porous fluorine-based resin membrane is 0.1 to 0.25 µm, and the maximum pore diameter is 0.3 to 0.45 µm.

5. The porous fluorine-based resin membrane of claim 1, wherein the porous fluorine-based resin membrane has a thickness of 20 to 100 µm.

6. The porous fluorine-based resin membrane of claim 1, wherein the fluorine-based resin is at least one selected from polytetrafluoroethylene, tetrafluoroethylene-perfluoroalkyl-vinylether copolymer, tetrafluoroethylene-hexafluoropropylene copolymer, ethylene-tetrafluoroethylene copolymer resin, tetrafluoroethylene-chlorotrifluoroethylene copolymer and ethylene-chlorotrifluoroethylene resin.

7. The porous fluorine-based resin membrane of claim 1, wherein the fluorine-based resin comprises polytetrafluoroethylene having a standard specific gravity of 2.14 to 2.22 as measured using JIS K6892.

8. A method for preparing the porous fluorine-based resin membrane according to claim 1, comprising the steps of:
preparing a fluorine-based resin sheet by mixing a fluorine-based resin and a lubricant to prepare a fluorine-based resin composition, applying pressure to the fluorine-based resin composition to form a preformed body; extruding the preformed body in a form of a sheet using a die, followed by rolling; and then conducting a heat-treating the sheet at 120° C. to 200° C.;
stretching the fluorine-based resin sheet in a ratio of from 1 to 12 times in the machine direction at a temperature of 200° C. to 340° C.;
stretching the sheet stretched in the machine direction, in a ratio of from 5 to 25 times in the transverse direction at 200° C. to 320° C.; and then
heat setting the sheet stretched in the machine direction and the traverse direction at a temperature of 370° C. to 390° C. for 5 seconds to 9 seconds,
wherein the extrusion step is carried out at a temperature of 25° C. to 50° C. and a pressure of 1 to 40 MPa.

9. The method for preparing the porous fluorine-based resin membrane of claim 8,
wherein the fluorine-based resin has a standard specific gravity of 2.14 to 2.22 as measured using JIS K6892.

10. A filter comprising the porous fluorine-based resin membrane according to claim 1.

11. The method of claim 8, wherein the method for preparing the porous fluorine-based resin membrane does not comprise a step of stretching the sheet in a transverse direction perpendicular to the machine direction of the sheet between the rolling step and the heat-treating step.

* * * * *